Oct. 28, 1952        A. D. GOETTL        2,615,620

FAN MOTOR MOUNT ON VENTILATING PANEL

Filed June 23, 1950

INVENTOR
ADAM D. GOETTL
BY Scott L. Nourse
ATTORNEY

Patented Oct. 28, 1952

2,615,620

UNITED STATES PATENT OFFICE 2,615,620

FAN MOTOR MOUNT ON VENTILATING PANEL

Adam D. Goettl, Phoenix, Ariz.

Application June 23, 1950, Serial No. 169,923

4 Claims. (Cl. 230—259)

This invention relates to fan motor mounts on ventilating panels.

More particularly the invention concerns mounts for electric motors carrying disk type fans which operate in circular openings in panels which may be installed in windows or other openings in dwellings, or at the inner ends of ducts, or in the inner face of evaporator cooler boxes.

One of the objects of this invention is to provide a mount which, when attached to the face of a ventilating panel, will receive and clamp the fan motor case directly, and not through any intermediate base-piece or bracket, so that the fan is held in correct operating position in the opening in the panel, and so that the mount stiffens the panel and supplements its rigidity.

A second object is to provide a fan motor mount, as above mentioned which will attach to the panel at three or more places thereby gaining rigidity both for itself and for the resultant structure including the panel;

A third object is to provide a structure as above stated, whereby the motor is held in a cylindrical clamp which, in turn, is attached to the panel by a spider frame having radial arms which act as supports, stiffening members, and air flow directive vanes which will assist in channeling the air from behind the panel into the area in which the blades of the fan operate; and prevent rotating movement of the entering air adjacent the fan area;

Still another object is to provide a fan motor mount having a substantially cylindrical motor clamp and a plurality of thin sheet metal supporting arms set edgewise relative to said clamp extending radially therefrom, and attached to a ventilating panel so that a motor held in said clamp is rigidly held axially at right angles with reference to the panel but is resiliently held rotatively so that fan vibration is reduced and operating noise minimized.

I attain the foregoing objects by means of the devices and structure shown in the accompanying drawings in which—

Figure 1:
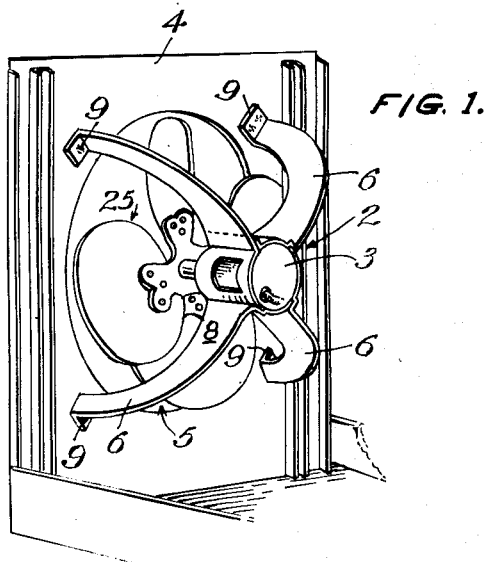
Figure 1 is a perspective view of the improved mount, here concerned, as installed on the back of an evaporative cooler case front panel and supporting a fan motor and disk type fan.
Figure 2:
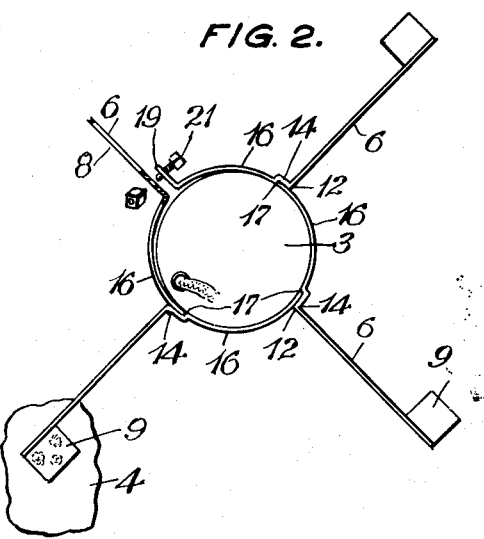
Figure 2 is a partial rear elevation of the mount.
Figure 3:
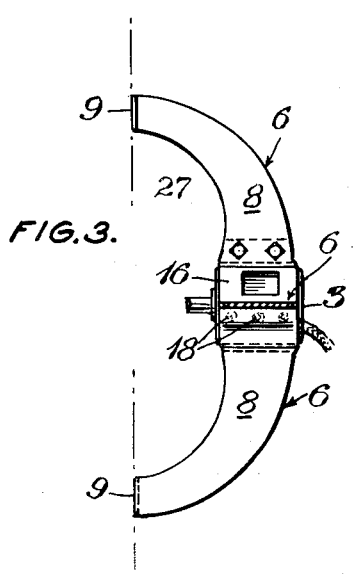

Figure 3, a side elevation thereof taken substantially on line 3—3 of Figure 1;

Similar numerals refer to similar parts in the several views;

In general, a cylindrical motor clamp 2 holds fan motor 3 and is attached to panel 4 by a spider frame 5.

More particularly, the cylindrical clamp 2 is composed of four elements 6. Each of these elements is particularly shaped to provide a radially extending arm portion 8 formed of sheet metal as a flat web which has a mounting pad 9 at its outer end. The inner end portion of the sheet metal material of which each web is made is then bent to the left at 12, provided with a joggle 14, and continued as an arcuate quarter round portion or section 16 of the cylindrical clamp 2. As here shown there are four elements 6. Each element is made of sheet metal and formed from a similarly shaped blank. When these elements are assembled the outer ends 17 of each arcuate portion 16, except one, are extended under the joggle 14 of the next adjacent element and spot welded thereto, as indicated at 18.

The last joint of this assembly is formed by bending the outer end of one of the arcuate clamp portions outward so that it forms a radially extending flange 19. This flange is then removably secured to the web 8 of the next adjacent element by bolts 21. This provides a take-up necessary to grip or clamp the case of motor 3.

Pads 9 are then spot welded or otherwise attached to panel 4, and the whole assembly assumes the shape of a spider support with the motor clamped at the middle. The element parts are proportioned so that the axis of the motor shaft is centrally positioned in ventilating opening 22 of panel 4, and so that fan 25 operates at the correct position therein. Constructed in this way, the spider becomes, in effect, a part of the panel 4. The panel may be made of thin metal or other material, and a comparatively heavy motor adequately supported. The pads 9 provide several points of support, and since the motor is gripped around the periphery of its case the tendency to wobble or vibrate, so often noticed when base mounts are used, is absent.

The motor 3 clamped in the center of this spider structure is held rigid axially with reference to panel 4; that is, its casing is gripped by the central clamping portion of the hub in such a manner that the motor shaft will be maintained rigidly in the center of panel opening 22 and its axis is maintained rigidly at right angles to the plane of the panel. However, since the panels extend radially edgewise the clamp portion 2 is free to rotate slightly in either direction and the motor case is, therefore, held resiliently with reference to slight rotative motions or vibrations. Hum, due to magnetic action within the motor is therefore substantially eliminated, and the tendency of the panel 4 to pick up vibration and act as a sounding board is removed because of the rigidity of the whole composite panel and spider structure.

It is pointed out that each radial web portion is formed with an arcuate inner edge 27 and an arcuate outer edge 29 of a larger radius. These edges are spaced so that there is a substantial breadth to web 8. These flat webs, therefore, act as flow directive baffles and tend to keep the air flowing toward panel opening 22, and keep it from rotating around and with the blades of the disk type fan 25. This also tends to minimize vibration and fan noise and causes the fan to move more air than otherwise.

I am aware that spider panel mounts for fan motors have heretofore been used but consider that a spider mount of thin webs constructed with a composite clamp, as here shown, combined with a metal panel structure, is a distinct improvement over the panel mounts heretofore used.

I claim:

1. A motor mount for supporting electric motors which have cylindrical cases and axially positioned shafts carrying disk type fans on panels at right angles to the axes of the motor shafts, consisting of four elements cut from sheet metal having their inner portions shaped and curved to form arcuate clamp sections, and their outer portions directed radially outward from said arcuate clamp sections by a bend parallel with the axis of said motor case and shaped to form flat supporting arms curving forward from said motor case over the fan on said motor shaft, and bent at right angles at their outer ends to form pads adapted for attachment to a supporting panel; the inner ends of each of said arcuate clamp sections being attached to the ends adjacent the supporting arms of each adjacent clamp section to provide a cylindrical clamp enclosing said motor case.

2. A motor mount for supporting electric motors which have cylindrical cases and axially positioned shafts carrying disk type fans on panels at right angles to the axes of the motor shafts, consisting of four elements cut from sheet metal having their inner portions shaped and curved to form arcuate clamp sections, and their outer portions directed radially outward from said arcuate clamp sections by a bend parallel with the axis of said motor case and shaped to form flat supporting arms curving forward from said motor case over the fan on said motor shaft and bent at right angles at their outer ends to form pads, adapted for attachment to a supporting panel; the inner ends of each of said arcuate clamp sections being attached to the clamp section ends of each adjacent clamp section to provide a cylindrical clamp enclosing said motor case; all of the attachments between said arcuate sections being permanent except one and that one being provided with screw means for adjustably varying the circumference of said clamp.

3. A motor mount for supporting, on a panel, electric motors having cylindrical cases and axial shafts therein carrying disk type fans, consisting of a plurality of elements cut from sheet metal; the inner portions thereof being shaped to form arcuate sections to extend partially around the case of said motor; the inner ends of each of said arcuate sections being the inner ends of said elements, and the outer ends of each arcuate section being defined by a bend in said element directing it radially outward relative to the axis of the motor to form a supporting arm; the outer, supporting arm, portions of each of said elements being shaped to form flat radially directed arms with their outer ends extending over the fan carried on said motor, and having pads for attachment to a panel; said arcuate sections being mutually attached, forming a cylindrical sleeve to enclose the case of the motor to be supported, with the inner end of each section attached to the outer end of the next adjacent arcuate section; and bolts joining the ends between at least two adjacent section ends forming clamping means for varying the circumference of said cylinder.

4. A motor mount for supporting, on a panel, electric motors having cylindrical cases and axial shafts therein carrying disk type fans, consisting of a plurality of elements cut from sheet metal; the inner portions thereof being shaped to form arcuate sections to extend partially around the case of said motor; the inner ends of each of said arcuate sections being the inner ends of said elements, the outer ends of each arcuate section being defined by a bend in said element directing it radially outward relative to the axis of the motor to form a supporting arm; the outer, supporting arm, portions of each of said elements being shaped to form flat radially directed arms with their outer ends extending over the fan carried on said motor, and having pads for attachment to a panel; said arcuate sections being mutually attached, forming a cylindrical sleeve to enclose the case of the motor to be supported; each arcuate section having a joggle formed adjacent its outer end to receive the inner end of the next adjoining section; welds joining the inner end of each arcuate section to the under side of the joggle on the adjacent arcuate section between all sections but one, and bolts joining the adjacent ends of said remaining sections to provide a take-up to shrink the circumference of said cylindrical sleeve.

ADAM D. GOETTL.

REFERENCES CITED

The following references are of record in the file of this patent:

UNITED STATES PATENTS

| Number | Name | Date |
|---|---|---|
| 1,614,190 | Dyer | Jan. 11, 1927 |
| 1,781,155 | Anderson | Nov. 11, 1930 |
| 2,126,599 | Anderson | Aug. 9, 1938 |